June 27, 1933.  A. J. GRANBERG  1,915,663
FLUID METER
Filed July 13, 1931  3 Sheets-Sheet 3
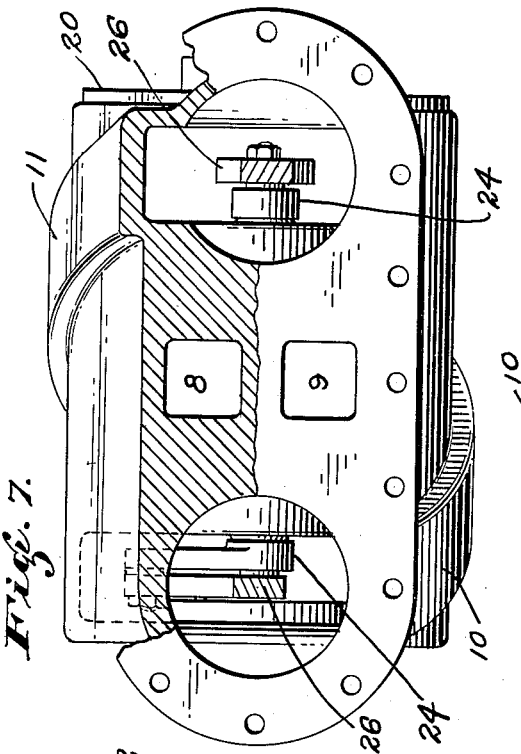
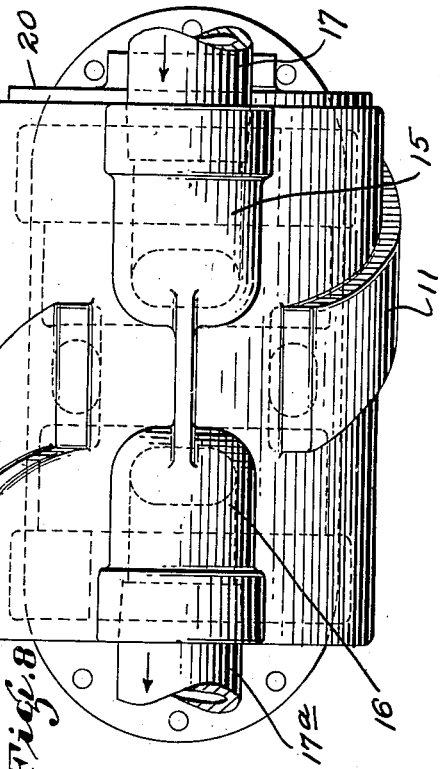
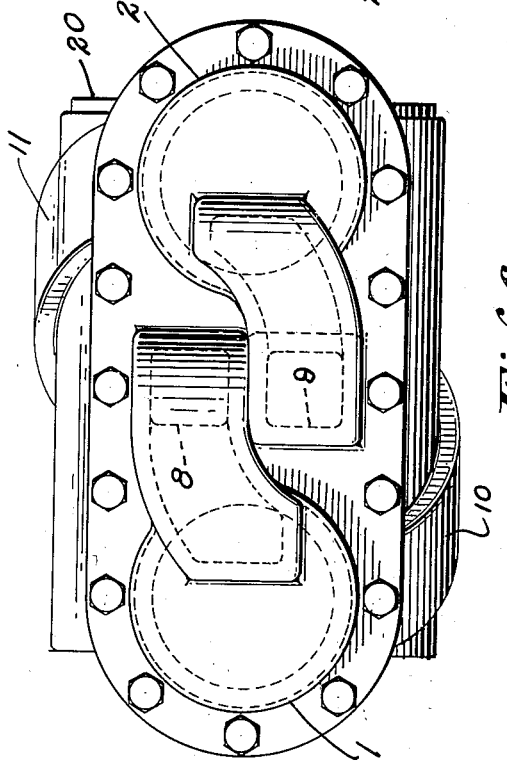
INVENTOR.
Albert J. Granberg.
BY
Townsend, Loftus & Abbett.
ATTORNEYS.

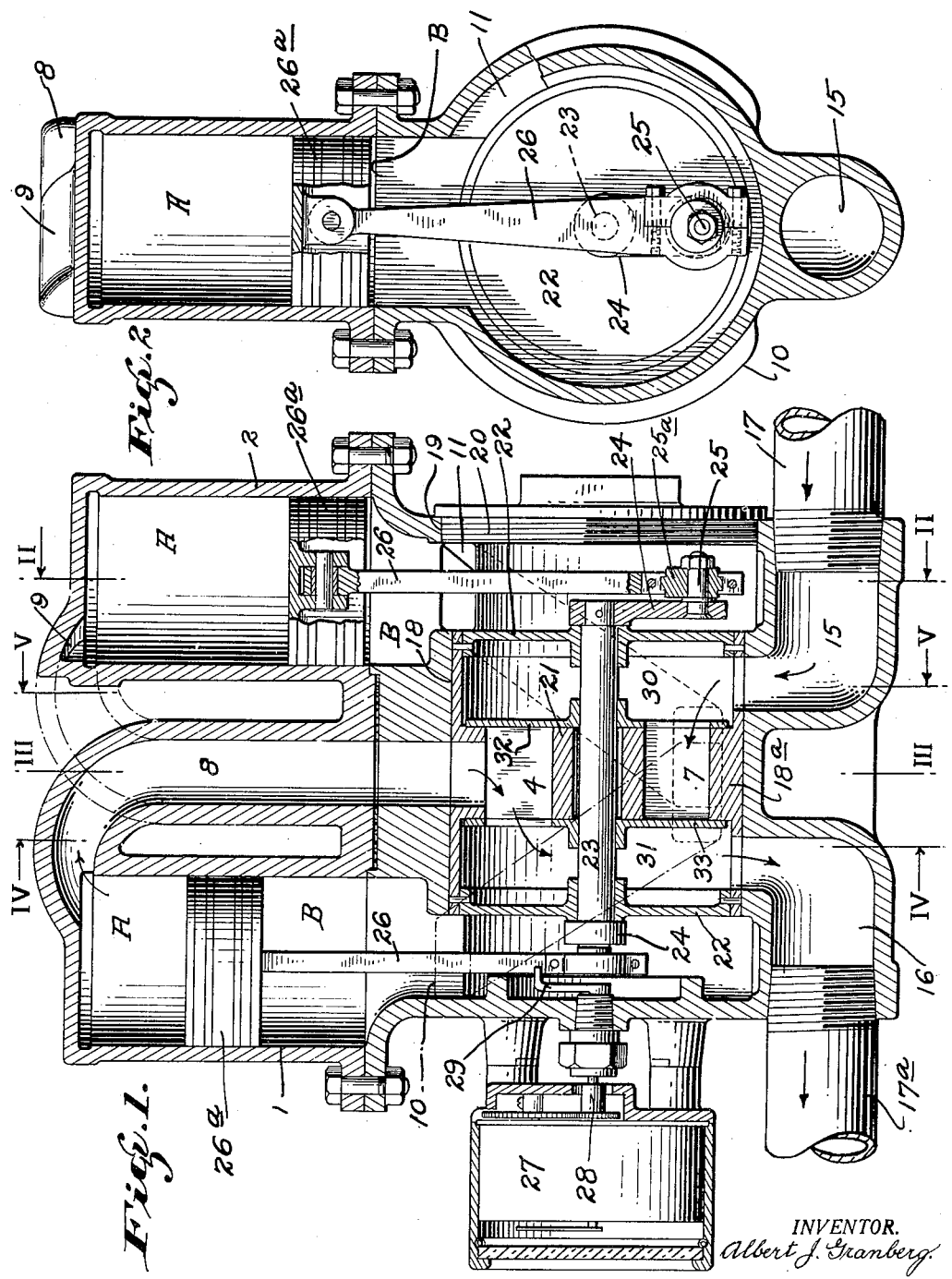

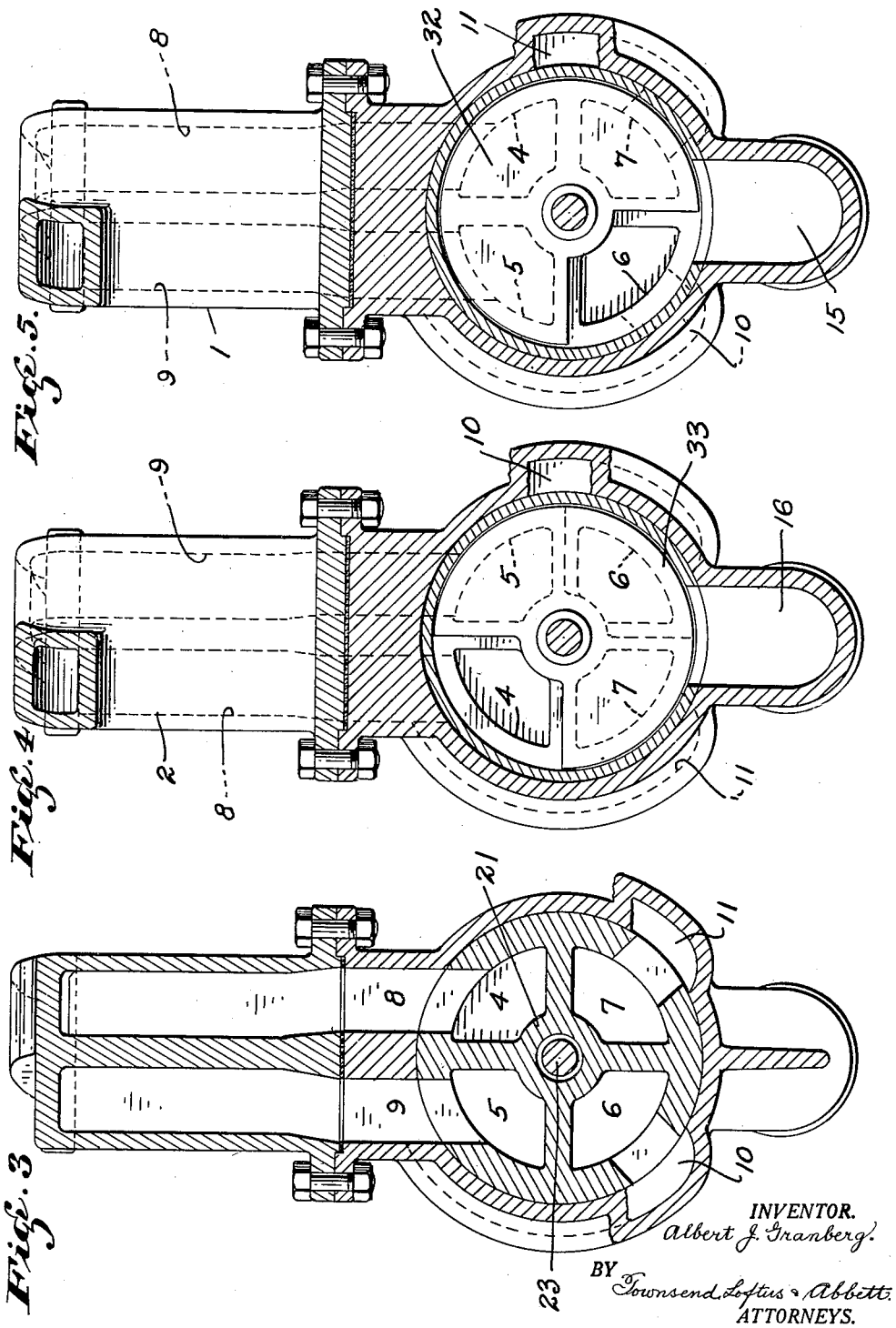

Patented June 27, 1933

1,915,663

UNITED STATES PATENT OFFICE

ALBERT J. GRANBERG, OF BERKELEY, CALIFORNIA, ASSIGNOR TO RALPH N. BRODIE COMPANY, OF OAKLAND, CALIFORNIA, A CORPORATION OF CALIFORNIA

FLUID METER

Application filed July 13, 1931. Serial No. 550,297.

This invention relates to fluid meters of the displacement type for measuring the volume of fluid passing through a pipe line.

It is the principal object of the present invention to provide a meter of the character referred to which is comparatively simple in design, inexpensive to manufacture and will operate efficiently to accurately measure and indicate the volume of fluid passing therethrough.

In carrying the invention into practice, I provide a meter casing, including a pair of metering cylinders each having a piston therein. These pistons are connected to a common crank shaft which in turn is connected to a counter or indicator so calibrated as to indicate the volume of fluid displaced by the pistons during the operation thereof. The crank shaft operates a valve mechanism so as to alternately deliver fluid to opposite ends of the pistons while permitting the fluid at the other ends to discharge so that upon one stroke of the pistons fluid is being delivered to one end thereof while fluid is being displaced and discharged from the other end, which operation is reversed at the end of each piston stroke so that the pistons will continually reciprocate. The pistons are so connected to the crank shaft that they operate at overlapping cycles so that the meter will not cease operating when the pistons reach dead center.

One form which the invention may assume is exemplified in the following description and illustrated by way of example in the accompanying drawings, in which:

Fig. 1 is a vertical longitudinal section through a meter embodying the preferred form of my invention.

Fig. 2 is a vertical transverse section through the same taken on line II—II of Fig. 1.

Fig. 3 is a vertical transverse section through the meter taken on line III—III of Fig. 1.

Fig. 4 is a vertical transverse section through the meter taken on line IV—IV of Fig. 1.

Fig. 5 is a vertical transverse section through the meter taken on line V—V of Fig. 1.

Fig. 6 is a plan view of the meter.

Fig. 7 is a view in plan with the cylinder casting removed and portions of the meter casing broken away and in section to disclose certain details of construction.

Fig. 8 is a bottom view of the meter.

Referring more particularly to the accompanying drawings, I have illustrated a meter of the displacement type which comprises generally a meter casing formed with two cylinders 1 and 2. These cylinders are arranged with their axes in parallelism and at a spaced distance apart as indicated. The cylinders 1 and 2 may be formed, if desired, in separate casting, bolted or otherwise secured to the body casting of the meter casing.

At the side or the bottom of the meter casing opposite the cylinders 1 and 2, the meter casing is formed with an inlet port 15 and an exhaust port 16. These ports are in axial alignment and are threaded so as to receive conduits 17 and 17ª so that the meter may be interposed in a pipe line conveying fluid under pressure to be metered.

Interposed between the cylinders 1 and 2 and the intake and exhaust ports 15 and 16 is a cylindrical valve cage bore 18. The axis of which is disposed at right angles to the axes of the cylinders 1 and 2. It will also be seen from Fig. 1 that the valve cage bore 18 is disposed substantially midway between the cylinders so that one cylinder will be disposed approximately at one end of the valve cage bore while the other cylinder is disposed at approximately the opposite end of the valve cage bore.

Pressed within the valve cage bore 18 is what I prefer to term a valve cage 18ª which consists of a cylindrical shell of an exterior diameter substantially the same as the diameter of the valve cage bore so that it may be pressed or otherwise securely fitted within this bore. The length of the valve cage 18ª is the same as the length of the valve cage bore.

In order to assemble the valve cage within the valve cage bore 18 one end of the meter casing is formed with a circular opening 19 which is disposed coaxially of the valve cage bore 18 and of sufficient diameter to enable the valve cage and its associated mechanism to be inserted through the opening and fitted into place in the valve cage bore. This opening 19 is enclosed by a removable cap 20.

The valve cage is formed with a central section 21, the ends of which are disposed in a plane parallel to the plane of the ends of the valve cage and at a spaced distance therefrom. That is to say the central section is disposed centrally of the valve cage. The valve cage 18ª is also fitted with end members 22 which prevent communication between the interior of the valve cage and the adjacent cylinders.

The end members 22 and the central section 21 of the valve cage are formed with suitable journals rotatably supporting a crank shaft 23 arranged coaxially of the valve cage. The ends of this crank shaft project beyond the ends of the valve cage and are fitted with crank arms 24 having eccentric disposed crank pins 25.

Each cylinder is provided with a connecting rod 26, the lower ends of which the connecting rods are connected to the crank pins 25. The other end of these connecting rods are fitted with pistons 26ª disposed one within each cylinder 1 and 2. The piston of each cylinder divides the same into two metering chambers A and B, which are disposed, of course, at opposite ends of the piston. It is intended, of course, that the pistons be reciprocated by fluid alternately admitted to opposite ends thereof.

When fluid is admitted to one metering chamber, fluid will be displaced from the opposite metering chamber by the piston and it is intended to indicate the volume of this displaced fluid in order to determine the amount of liquid passing through the meter. This is accomplished by providing an indicator or counter mechanism 27 provided with a drive shaft 28 which is operated by a crank 29 connected to one of the connecting rods 26 so that the counter will be operated by the operation of the crank shaft 23 to indicate the volume of fluid displaced in gallons or other units of measure.

In order to alternately admit fluid to opposite metering chambers of each cylinder, the central section 21 of the valve cage is formed with four distributing chambers 4, 5, 6 and 7, which are radially arranged and circumferentially spaced about the axis of the valve cage and which extend axially through the central section 21.

Distributing passageways 8, 9, 10 and 11 extend from these distributing chambers to the proper metering chambers of the cylinders. It will be noticed that the distributing passageways extend radially outwardly through the wall of the valve cage between the end surfaces of the central section and are continued in the casting of the meter casing.

It will be noticed from Figs. 1, 3, 4 and 5 particularly that the metering chamber A of cylinder 1 is connected with the distributing chamber 4 through the medium of the distributing passageway 8. The opposite metering chamber B of cylinder 1 communicates with the distributing chamber 6 through the medium of the passageway 10. The metering chamber A of cylinder 2 communicates with the distributing chamber 5 through the medium of the distributing passageway 9, while the opposite metering chamber B of cylinder 2 communicates with the distributing chamber 7 through the medium of the distributing passageway 11.

Between one end of the central section 21 and the adjacent end of the valve cage is an intake chamber 30 which is in communication with the intake port 15. The chamber in the opposite end of the valve cage or that indicated by 31 is an exhaust chamber communicating with the exhaust port 16.

I have provided valve means controlling the admittance of fluid from the intake chamber to the distributing chambers and controlling the exhaust of fluid from the distributing chambers to the exhaust chamber 31. This valve means comprises a pair of valve discs 32 and 33 which are fixedly secured on the crank shaft 23. These valve discs fit against the end faces of the central section 21 of the valve cage and therefore are capable of controlling the communication between the ends of the distributing chambers 4, 5, 6 and 7 and the chambers 30 and 31. The valve discs are circular and are of a diameter greater than the distance from the center of the shaft 23 to the outermost radial point of the distributing chambers. Each valve disc is formed with one port which is formed through an arc of 90 degrees and extends inwardly from the outer periphery of the discs so that it may register with the end of the distributing chambers. The ports of the valve discs 32 and 33 are disposed 180 degrees apart and it will be noticed that segmental shaped ends of the distributing chambers extend through an angle of less than 90 degrees.

As the crank shaft revolves, the ports in the valve discs so cooperate with the distributing chambers 4, 5, 6 and 7 that fluid is admitted to one metering chamber of each cylinder and permitted to discharge from the opposite metering chamber. For example when the valve disc 32 is in a position where the distributing chamber 6 is in communication with the intake chamber 30 fluid will pass through the distributing chamber 6 and through the distributing passageway 10 into the metering chamber B of cylinder 1. At the same time the relative position of the ports in the valve discs will be such that the distributing chamber 4 will be in communication with the exhaust chamber 31 through the port in the exhaust valve disc 33 so that fluid may discharge from the metering chamber A in the cylinder 1 through the distributing passage 8, the chamber 4, and thence through the exhaust chamber 31 and the exhaust port 16.

Due to the fact that the cranks 24 of the crank shaft 23 are disposed at 90 degrees apart, the piston in cylinder 2 will be on dead center, but however continued movement of the piston and cylinder 1 will move the piston in cylinder 2 off of dead center to a point where the port in the intake valve disc 32 will start to uncover the distributing chamber 7 and place it in communication with the intake chamber 30 which will direct fluid to the metering chamber B at cylinder 2 and commence operating the piston. Simultaneously with this the exhaust valve disc 33 will commence to uncover distributing chamber 5 so as to enable the discharge of fluid from the metering chamber A in cylinder 2 through the distributing passageway 9 and thence into the exhaust chamber 31 to the exhaust port 16. When the piston in cylinder 1 comes on top dead center distributing chambers 4 and 6 will be fully closed and the distributing chambers 5 and 7 will be fully opened causing the piston in cylinder 2 to be half way through its stroke. Thus the piston in cylinder 2 will act to carry the cylinder 1 over dead center as the ports in the valve discs 32 and 33 will commence to uncover ports 4 and 6 in a manner reverse to that just directed. That is, the port in the intake valve disc 32 will commence to register with the intake end of the distributing chamber 4 to admit fluid to the metering chamber A of cylinder 1, while the port in the exhaust valve disc 33 will commence to register with the exhaust end of the distributing chamber 6 to enable fluid in the metering chamber B of cylinder 1 to discharge.

In order to adjust the meter, it is necessary to adjust the length of the piston strokes. This can be done in connection with either one or both pistons.

In the present instance, I have shown an eccentric bushing 25a as fixed to the crank pin 25 of the crank 24 of cylinder 2. The outer circumference of this eccentric bushing is rotatable in the bearing of the connecting rod 26 of cylinder 2. By loosening this bushing 25a and rotating it slightly on the crank pin 25, the stroke of the piston 26a in cylinder 2 will be changed so as to vary the flow of fluid displaced thereby. By such adjustment, the amount of fluid displaced may be made to exactly agree with the indication of counter 27.

In operation of the device, it is constructed and assembled as shown in the accompanying drawings and assuming that the valve discs 32 and 33 are in the positions shown in the drawings, fluid will enter the intake chamber 30 from the intake port 15 and inasmuch as the port in the intake valve 32 is in register with the intake end of the distributing chamber 6 fluid will enter this distributing chamber and pass through the distributing passageway 10 to the metering chamber B of cylinder 1 tending to force the piston therein upwardly to displace the liquid in metering chamber A of said cylinder. The liquid so displaced will pass out of the meter chamber through the distributing passageway 8 and due to the fact that the port in the exhaust valve disc will be in register with the exhaust end of the distributing chamber 4 the fluid may pass into the exhaust chamber 31 and thence to the exhaust port 16. At this time the piston in cylinder 2 will be on dead center, but the action of piston 1 will carry it over dead center to a point where the port in the intake disc 32 will commence to uncover the intake end of the distributing chamber 7 which will admit fluid to the metering chamber B of cylinder 2 through the distributing passageway 11.

Simultaneously with the registration of the port in the intake valve disc 32 with the intake end of distributing chamber 7, the port in the exhaust valve disc 33 will register with the discharge end of distributing chamber 5, so that fluid displaced by the upward movement of the piston in cylinder 2 may be discharged through the distributing passageway 9 to the exhaust chamber 31 and thence through the exhaust port 16. When the piston in cylinder 1 reaches dead center, the port in the intake valve 32 will be out of register with the intake end of the distributing chamber 6 and the port in the exhaust valve 33 will be out of register with the exhaust end of the distributing chamber 4, but the action of the piston in cylinder 2, however, will carry the piston in cylinder 1 over dead center until the port in the intake valve 32 commences to register with the intake end of distributing chamber 4 so that fluid from the intake chamber 30 will pass through this distributing chamber to the metering chamber A of cylinder 1. At the same time the port in the exhaust valve 33 will commence registering with the exhaust end of the distributing chamber 6 so that fluid displaced in the metering chamber B of cylinder 1 may discharge.

It is thus seen that as one piston reaches top or bottom dead center, the opposite piston carries it over dead center due to the fact that the cranks of the pistons are arranged at 90 degrees apart so that the pistons will operate in overlapping cycles.

It will be noticed that at each stroke of the piston communication between the metering chambers of the cylinder in which said piston is mounted and the intake and exhaust chambers is reversed so that on one stroke the metering chamber A is in communication with the intake chamber and the metering chamber B is in communication with the exhaust chamber, while on the opposite stroke, the metering chamber A is in communication with the exhaust chamber and the metering chamber B is in communication with the intake chamber.

In order to adjust the meter so that the counter or indicator will exactly indicate the volume of fluid displaced therein, the stroke of one piston may be varied. It may be desirable, however, to vary the stroke of both pistons, which can be done, of course, by merely fitting the other piston with an adjusting device as described.

As previously described, rotation of the crank shaft by the pistons operates the counter of indicator 27 through the medium of the crank 29 so that the volume of liquid passed through the meter will be indicated.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A meter comprising a meter casing being formed with a pair of parallel cylinders which are spaced apart, a crank shaft journalled in said casing at right angles to the axes of the cylinders, one end of the crank shaft being disposed adjacent with the axis of each cylinder, a reciprocable piston in each cylinder, a connecting rod pivotally connected to each piston, a crank at each end of the crank shaft and pivotally connected with the contiguous connecting rod, said cranks being disposed at ninety degrees apart, said pistons dividing each cylinder into two metering chambers, a valve cage within the casing and concentrically disdisposed about the crank shaft intermediate the cylinders, said valve cage having an intake chamber formed at one end thereof and an exhaust chamber formed at the opposite end thereof, said meter casing having an intake port communicating with the intake chamber and an exhaust port communicating with the exhaust chamber, said valve cage being formed with four distributing chambers disposed intermediate the intake and exhaust chambers and capable of communicating therewith, said casing being formed with four distributing passageways one communicating with each distributing chamber and with each metering chamber, valve disks secured on the crank shaft and rotatable therewith to control the communication between the distributing chambers and the intake and exhaust chambers, each valve disk being formed with a port, said ports being adapted to register successively with the distributing chambers to place the same in communication at properly timed intervals with the intake and exhaust chambers whereby fluid will be delivered to one metering chamber and permit it to discharge from the opposite metering chamber of each cylinder during one stroke of the piston therein and to reverse said communication during the opposite piston stroke, and an indicator driven by said crank shaft to indicate the volume of fluid passing through the metering chamber s.

2. A meter comprising a meter casing being formed with a pair of parallel cylinders which are spaced apart, a crank shaft journalled in said casing at right angles to the axis of the cylinders, one end of the crank shaft being disposed adjacent with the axis of each cylinder, a reciprocable piston in each cylinder, a connecting rod pivotally connected to each piston, a crank at each end of the crank shaft and pivotally connected with the contiguous connecting rod, said cranks being disposed at ninety degrees apart, said pistons dividing each cylinder into two metering chambers, a valve cage within the casing and concentrically disposed about the crank shaft intermediate the cylinders, said valve cage having an intake chamber formed at one end thereof and an exhaust chamber formed at the opposite end thereof, said meter casing having an intake port communicating with the intake chamber and an exhaust port communicating with the exhaust chamber, said valve cage being formed with four distributing chambers disposed intermediate the intake and exhaust chambers and capable of communicating therewith, said casing being formed with four distributing passageways one communicating with each distributing chamber and with each metering chamber, valve disks secured on the crank shaft and rotatable therewith to control the communication between the distributing chambers and the intake and exhaust chambers, each valve disk being formed with a port, said ports being adapted to register successively with the distributing chambers to place the same in communication at properly timed intervals with the intake and exhaust chambers whereby fluid will be delivered to one metering chamber and permitted to discharge from the opposite metering chamber of each cylinder during one stroke of the piston therein and to reverse said communication during the opposite piston stroke, an indicator driven by said crank shaft to indicate the volume of fluid passing through the metering chambers, and means for varying the stroke of one piston to insure agreement between the indicator and the volume of fluid passing through the meter.

3. A meter comprising a meter casing formed with a pair of parallel cylinders which are spaced apart, said meter casing being formed with a valve cage bore at the inner ends of the cylinders and intermediate the same and disposed with its axis at right angles to the axes of the cylinders, a valve cage including a cylindrical shell tightly fitting said valve cage bore and agreeing in length therewith, end members secured to the ends of said valve cage and preventing communication between the interior thereof and the adjacent ends of the cylinders, a crank shaft journalled in said end members and disposed with its axis at right angles to the axes of the cylinders, one end of the crank shaft being disposed adjacent to the axis of each cylinder, a preciprocable piston in each cylinder, said pistons dividing each cylinder into two metering chambers, a connecting rod pivotally connected to each piston, a crank at the end of the crank shaft and pivotally connected with the contiguous connecting rod, said cranks being disposed at ninety degrees apart, said meter casing being formed with a circular opening in alignment with the valve cage bore and through which the valve cage and associated mechanism is insertable, a removable closure for said opening, said valve cage having a central section with its ends in a plane parallel to the ends of the valve cage and spaced therefrom forming an intake chamber at one end of the valve cage and an exhaust chamber at the opposite end thereof, said casing and valve cage being formed with an intake port communicating with the intake chamber and an exhaust port communicating with the exhaust chamber, said central section being formed with four distributing chambers disposed radially about the crank shaft, said meter casing and valve cage being formed with four distributing passageways one communicating with each distributing chamber and with each metering chamber, valve disks secured on the crank shaft within the valve cage and seating against the ends of said central section, said valve disks being rotatable with the crank shaft to control the communication between the distributing chambers and the intake and exhaust chambers, each valve disk being formed with a port, said ports being adapted to register successively with the distributing chambers to place the same in communication at properly timed intervals with the intake and exhaust chambers whereby fluid will be delivered to one metering chamber and permit it to discharge from the opposite metering chamber of each cylinder during one stroke of the piston therein and to reverse said communication during the opposite piston stroke, and an indicator driven by said crank shaft to indicate the volume of fluid passing through the metering chambers.

ALBERT J. GRANBERG.